United States Patent Office 3,326,300
Patented June 20, 1967

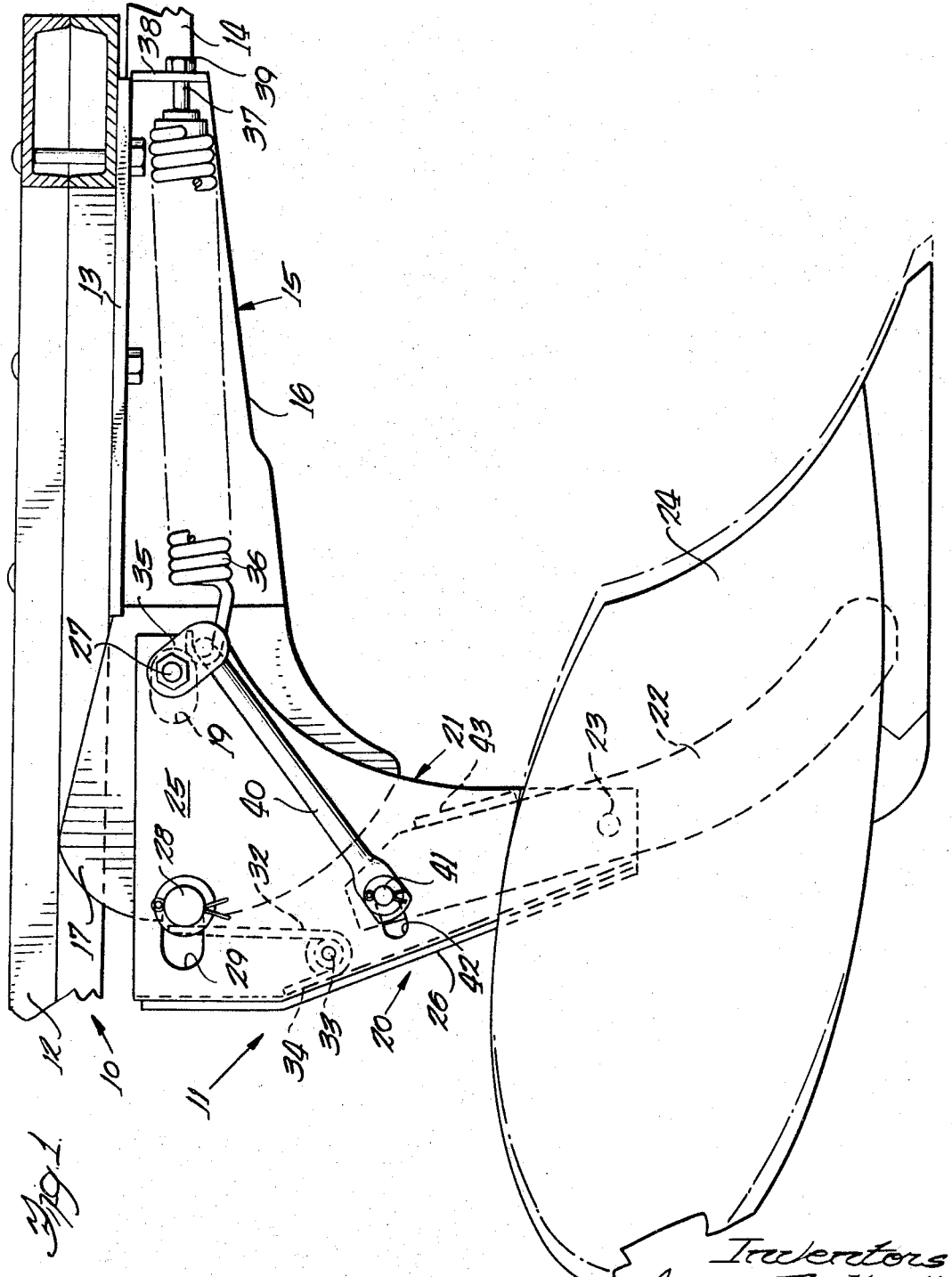

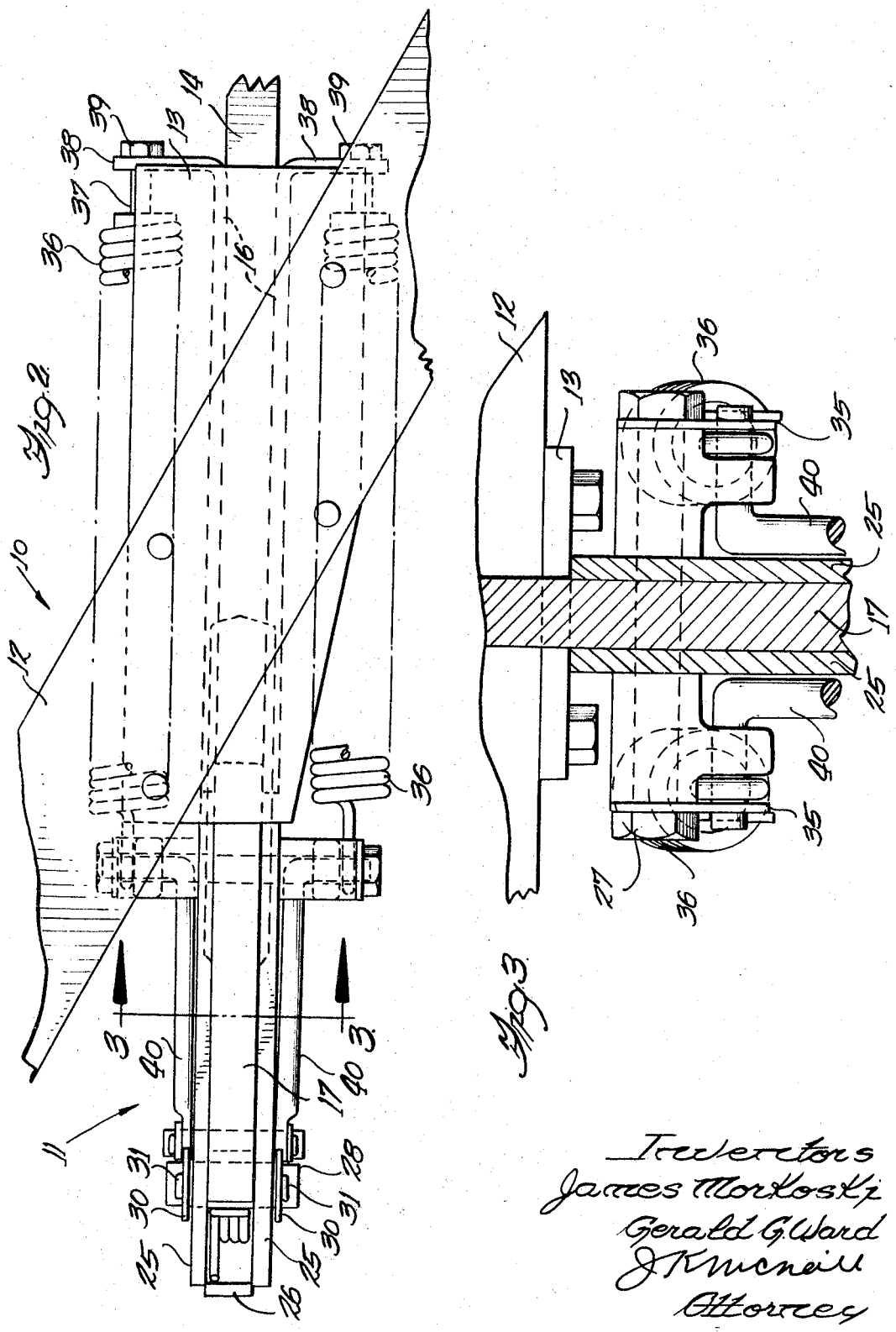

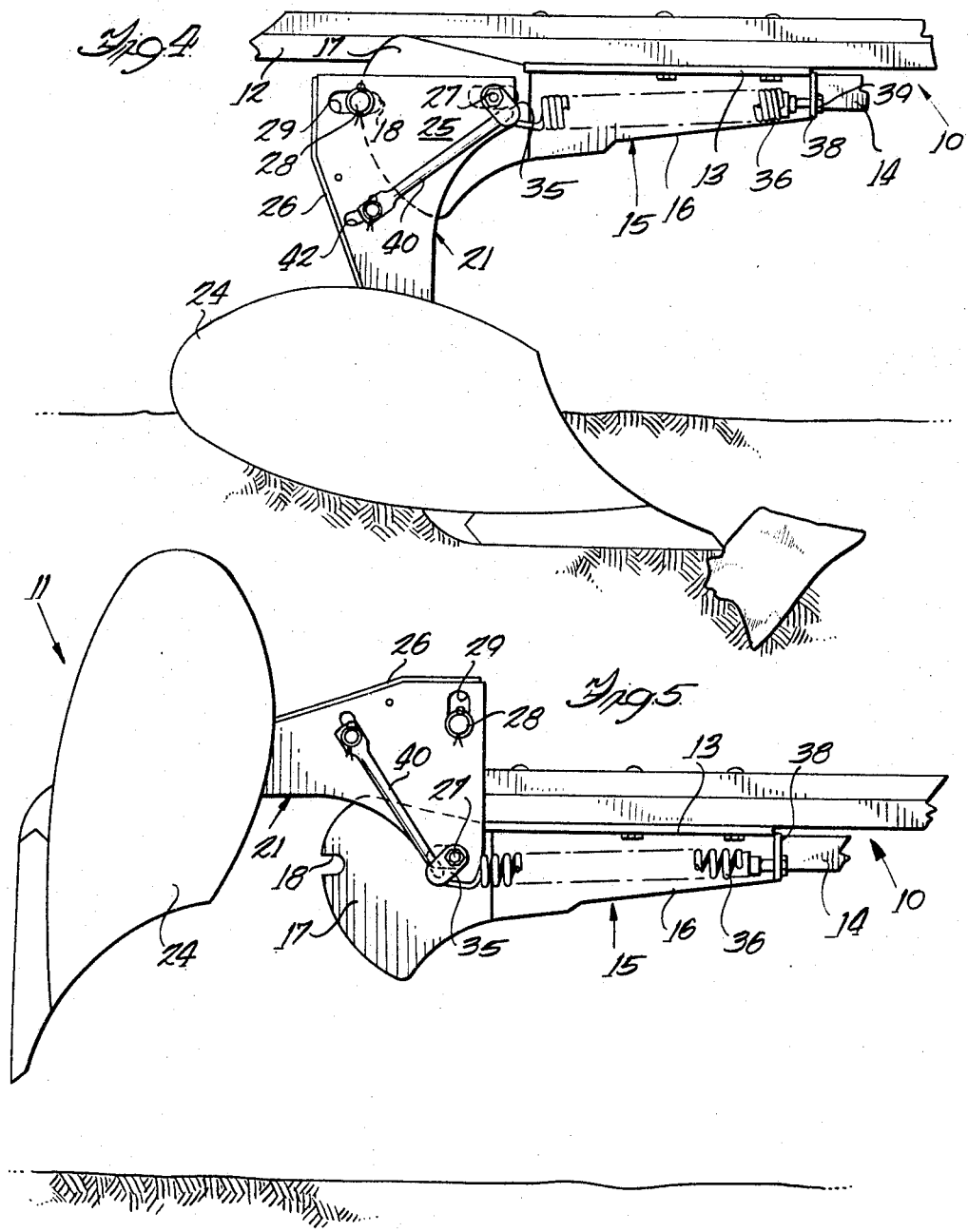

3,326,300
CUSHION SPRING TRIP UNIT FOR MOLDBOARD PLOWS
James Morkoski, Clarendon Hills, and Gerald G. Ward, Naperville, Ill., assignors to International Harvester Company, Chicago, Ill., a corporation of Delaware
Filed May 7, 1965, Ser. No. 453,913
4 Claims. (Cl. 172—264)

ABSTRACT OF THE DISCLOSURE

A plow standard is mounted on its supporting frame by pivot means permitting the plow to move rearwardly against spring pressure and to trip about the axis of the pivot means. The plow standard is locked against tripping by carrying a roller in a slot and seated in a rearwardly opening notch in the frame. The slot allows said limited rearward movement of the plow without tripping but insures its own tripping by forcing the roller from the notch in the frame after a predetermined rearward movement of the standard.

This invention relates to agricultural implements and particularly to plows, and has for its object the provision of improved trip mechanism for a moldboard plow or the like.

Another object of the invention is the provision of improved plow trip mechanism wherein a limited range of cushioned yielding of the plow unit is accommodated without tripping when draft conditions exert insufficient force to trip the plow.

Another object of the invention is the provision of a moldboard plow or the like of improved construction having cushioned tripping means designated to avoid damage to the plow bottom under a variety of draft conditions.

Other objects and advantages of the invention will become clear from the following detailed description when read in conjunction with the accompanying drawings, wherein:

FIGURE 1 is a side elevation, partly in section, showing a plow assembly incorporating the features of this invention mounted on a supporting frame;

FIGURE 2 is a plan view of the structure shown in FIGURE 1;

FIGURE 3 is a section taken on the line 3—3 of FIGURE 2;

FIGURE 4 is a view in side elevation similar to FIGURE 1, on a smaller scale, showing the cushioning effect when the plow bottom encounters an obstruction; and FIGURE 5 is a view similar to FIGURE 4 showing the plow unit in its completely tripped position.

Referring to the drawings, the numeral 10 designates a supporting frame upon which are mounted one or more moldboard plow units 11. Frame 10 includes a diagonally extending backbone 12 to which is secured a plate 13 having affixed thereto a longitudinally extending tool beam 14. A bracket 15 forming part of the frame includes a pair of plates 16 affixed to opposite sides of beam 14. The rear ends of plates 16 have secured therebetween a cam member 17 having a rearwardly opening notch 18 formed therein and, forwardly of the notch, and in general alignment therewith, a longitudinally extending slot 19.

Plow unit 11 comprises a standard 20 including an upper section 21 and a lower section 22 pivotally connected at 23 to the upper section and having a plow bottom 24 mounted on its lower end.

Upper section 21 comprises a pair of laterally spaced plates 25 on opposite sides of cam member 17 and provided at their rear ends with a closure member 26. A pivot pin 27 is mounted in the forward upper portions of plates 25 for longitudinal sliding movement in slot 19. The plow carrying standard 20 is therefore capable of tripping by pivoting rearwardly and upwardly as shown in FIGURE 5 about the axis of pivot pin 27. Tripping of the plow unit is prevented by the provision of a locking pin in the form of a roller 28 receivable in notch 18 and slidably mounted in slots 29 provided in plates 25. Roller 28 is prevented from displacement from plates 25 by the provision of washers 30 and cutters 31.

Roller 28 is urged to the forward end of slot 29 by a torsion spring 32 mounted on a pin 33 carried between plates 25 and having one arm 34 bearing against closure 26 and the other arm bearing against the roller 28.

Under normal operating conditions, pin 27 is maintained at the forward end of slot 19 and roller 28 is held in notch 18 by the provision of a crank arm 35, the lower end of which is connected to one end of an extension spring 36, to the other end of which is adjustably secured a bolt 37 slidable in an opening provided in a flange 38 projecting laterally from the forward end of each of the plates 16, and having a head 39. Crank arms 35, one on each side of the plow unit, are also connected by rods 40 to a pin 41 slidable in a slot 42 in plates 25, pin 41 being carried in an opening provided in the upper end of lower section 22 of standard 11.

In the operating position of the plow unit shown in FIGURE 1, springs 36 yieldably hold pin 27 at the forward end of slot 19 and cause the upper portion of lower standard section 22 to engage a stop 43 mounted between plates 25. Abnormal draft forces such as obstructions encountered by the plow bottom 24 insufficient to cause tripping of the plow allows the plow unit to cushion rearwardly against the action of springs 36 within the limits of slot 19 and notch 18 prior to release of roller 28 from the notch.

Upon the plow bottom encountering an obstruction such as shown in FIGURE 4, the plow unit moves rearwardly against the action of springs 36 to an intermediate position as shown in FIGURE 4 until the roller 28 is released from the notch. The freedom of the roller to revolve in slot 29 and the pressure of the plow unit against the roller and against the upper edge of notch 18 causes roller 28 to rotate and facilitates its release from the notch, whereupon it rides upwardly over the arcuate rear surface of cam 17 to a completely tripped position shown in FIGURE 5. However, positive release of the roller from the notch is effected by the fact that the roller engages the forward end of slot 29, so that rearward movement of the plow carrying standard actually carries the roller with it and positively removes it from notch 18 when the draft forces are sufficient to cause the plow to trip.

In addition to the tripping action shown in FIGURE 5 and the normal cushioning action between the positions of FIGURES 1 and 4, engagement of the forward point of the plow bottom with an obstruction tending to lift the plow bottom at its forward end, places a great strain upon the plow point by the upward component directed thereagainst, and this is cushioned by causing the plow unit to revolve about pivot pin 27 to a limited extent in a counterclockwise direction as viewed in FIGURES 1, 4 and 5. This is accomplished by rocking of the lower standard section 22 about its pivot 23 in a counterclockwise direction, exerting a force rearwardly on rods 40 against the action of springs 36, causing pin 41 to move rearwardly in slot 42. This action has been further described and claimed in co-pending U.S. application Ser. No. 350,240, filed Mar. 9, 1964, to which reference may be had for a further explanation thereof.

It is believed that the novel plow cushioning and tripping mechanism of the present invention will be clearly understood from the foregoing description. It should likewise be understood that the invention has been described in its preferred embodiment and that modifications may be therein without departing from the spirit of the invention or the scope of the appended claims.

What is claimed is:

1. In implement tripping mechanism, a supporting frame having a tool-carrying standard, means mounting the standard on the supporting frame for tripping including a pivot member connecting said standard to the frame by means accommodating generally horizontal rearward movement of the standard relative to the frame and angular swinging movement of the standard in one direction rearwardly and upwardly about the axis of said pivot member in response to abnormal draft conditions encountered by the tool, spring means operatively connected between the frame and said standard to oppose the tripping of said standard, and releasable means locking the standard against tripping under normal draft conditions comprising, a rearwardly opening notch formed in the frame, said standard having a longitudinally extending slot therein in registry with said notch, and a retainer receivable in said slot and said notch, the forward end of said slot being spaced forwardly of said retainer during normal operation of the tool and engageable with said retainer upon said rearward movement of said standard to force the retainer from the notch, said pivot member being a pin carried by the standard and the supporting frame having another longitudinally elongated slot therein to slidably receive said pin.

2. In a trip beam plow a traveling frame having a generally longitudinally extending opening therein, a tool-carrying standard, pivot means carried by the standard and received in said opening for mounting the standard on the frame for tripping rearwardly and upwardly about on the frame for tripping rearwardly and upwardly about said pivot means in response to abnormal draft conditions encountered by the tool, said standard having a generally horizontal slot therein rearwardly of said pivot means and said frame having a notch therein in registry with said slot, a freely rotatable roller carried by the standard in said slot and disposed at the forward end of said notch, spring means operatively connected between the frame and said pivot means for holding the tool-carrying standard against tripping, the connection of said pivot means in said opening accommodating limited rearward movement of the standard against the action of said spring to release said roller from said notch, said roller being disposed against the forward end of the slot in said standard in the normal operating position of the tool, whereby rearward movement of said standard forces and roller from said notch.

3. The invention set forth in claim 2, wherein said frame is provided with cam means and said notch is formed in said cam means and opens rearwardly therefrom.

4. The invention set forth in claim 3, wherein a spring is mounted on said standard and engages said roller to bias the roller toward the forward end of said slot.

References Cited

UNITED STATES PATENTS 3,125,167    3/1964    Mannheim et al. ____ 172—269
3,202,223    8/1965    Fulton _____ 172—264

ABRAHAM G. STONE, *Primary Examiner.*

J. R. OAKS, *Asistant Examiner.*